J. GOETZ, W. K. BUXBAUM & F. A. PARSONS.
LUBRICATOR FOR TABLE BEARINGS OF MILLING MACHINES.
APPLICATION FILED JULY 14, 1913.
1,097,221.
Patented May 19, 1914.
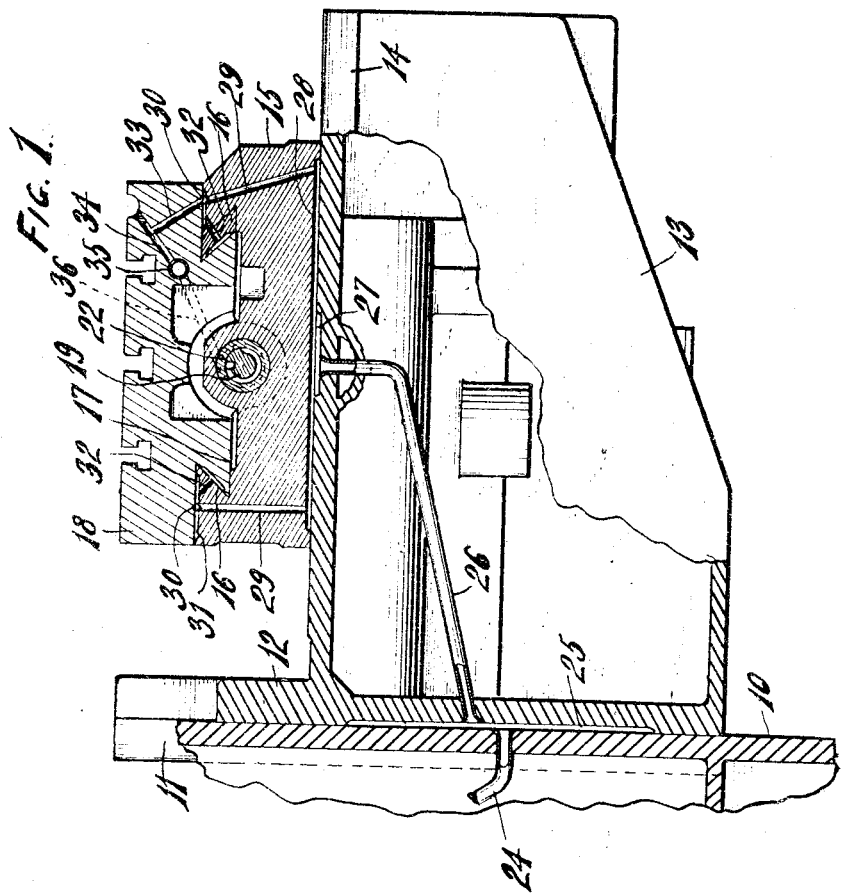
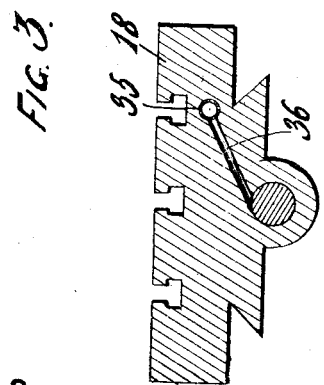
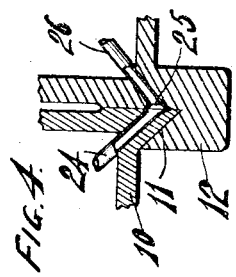

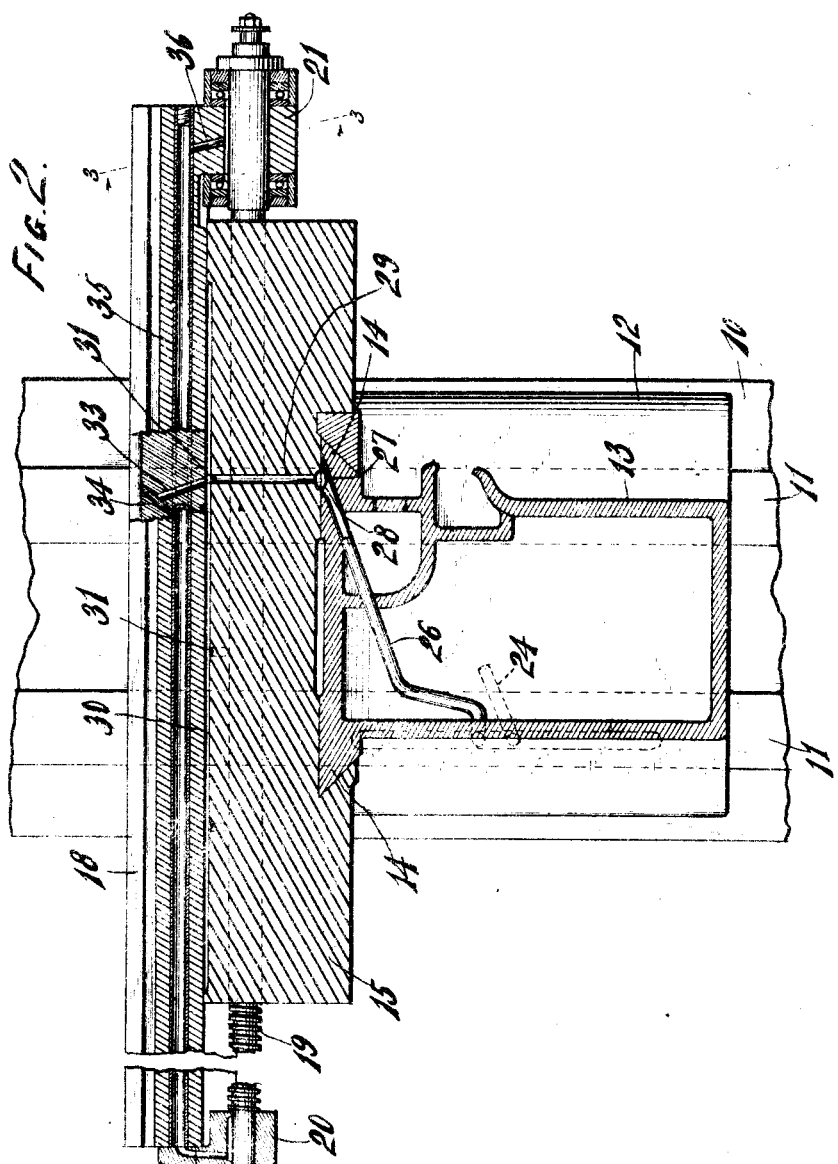

UNITED STATES PATENT OFFICE.

JOHN GOETZ, OF WEST ALLIS, AND WILLIAM K. BUXBAUM AND FRED A. PARSONS, OF MILWAUKEE, WISCONSIN, ASSIGNORS TO THE KEMPSMITH MANUFACTURING CO., OF MILWAUKEE, WISCONSIN, A CORPORATION OF WISCONSIN.

LUBRICATOR FOR TABLE-BEARINGS OF MILLING-MACHINES.

1,097,221.  Specification of Letters Patent.  Patented May 19, 1914.

Application filed July 14, 1913.  Serial No. 778,891.

*To all whom it may concern:*

Be it known that we, JOHN GOETZ, WILLIAM K. BUXBAUM, and FRED A. PARSONS, citizens of the United States, and residents, respectively, of West Allis, in the county of Milwaukee and State of Wisconsin, and of Milwaukee, in the county of Milwaukee and State of Wisconsin, have invented new and useful Improvements in Lubricators for Table-Bearings of Milling-Machines, of which the following is a description, reference being had to the accompanying drawings, which are a part of this specification.

This invention has for its object to provide a force feed lubricating system for the bearings of the traveling table of a milling machine without an undue waste of lubricant.

With the above and other objects in view the invention consists in the lubricating system as herein claimed and all equivalents.

Referring to the accompanying drawings in which like characters of reference indicate the same parts in different views: Figure 1 is a longitudinal sectional view through the knee of a milling machine and the parts associated therewith showing portions of the lubricating system of this invention; Fig. 2 is a sectional view on a plane at right angles to the sectional view of Fig. 1; Fig. 3 is a transverse sectional view of the end table on the plane of line 3—3 of Fig. 2; and, Fig. 4 is a horizontal detail sectional view through one of the sliding connections of the knee with the column or casing, showing the lubricant communication between the stationary and the movable parts.

In these drawings 10 indicates a casing or upright column of a milling machine provided with beveled flanges 11 around which fit the corresponding beveled flanges 12 of a vertically adjustable knee 13, the means for adjusting the knee vertically not being shown as it may be of any ordinary construction. The knee has beveled flanges 14 at its upper edges forming guides for a horizontal sliding saddle 15 adjustable thereon toward or away from the column as usual, and the saddle in turn has undercut flanges 16 forming a guideway for the dovetailed guide flanges 17 on the bottom of the table 18 which is thus horizontally movable on the saddle at right angles to the direction of movement of the saddle on the knee. The means for adjusting the saddle on the knee is not illustrated as any usual adjusting means may be employed for this purpose. The means for adjusting the table on the saddle, however, is shown as constituting the ordinary feed screw 19 journaled in bearings 20 and 21 at the ends of the table and passing through a fixed nut member 22 in the saddle so that a turning of the feed screw either by means of the crank handle 23 on the front end thereof, or by the usual gear mechanism, not shown, causes the longitudinal traveling movement of the table 18 on the saddle 15.

It is the object of the present invention to provide a force feed lubricant supply to the bearings of the feed screw and the guide bearings of the table in any adjustment of the parts and at all times during the traveling movements thereof. A lubricant supply pipe 24 leading from any suitable source of lubricant supply under pressure connects with one of the beveled flanges 11 of the column or casing of the milling machine where it will have communication with a vertical groove 25 on the meeting face of the knee which fits tightly against the flat face of the flange 11, said groove being of sufficient length to remain in communication with the lubricant feed pipe 24 in any vertical adjustment of the knee. A lubricant pipe 26 extends from the groove 25 to a groove 27 in the top bearing surface of the knee and a groove 28 in the bottom of the saddle and extending transversely of the saddle registers with the groove 27 to maintain communication with the lubricant pipe 26 in any adjustment of the saddle on the knee. Approximately vertical passageways 29 at each side of the saddle 15 lead from the groove 28 to longitudinal grooves 30 in the top of the saddle extending nearly the full length of the saddle and covered by the table 18. At intervals the grooves 30 in the top of the saddle are crossed by short grooves 31 to distribute lubricant over the bearing surface between the saddle and the table and inclined passageways 32 lead from these cross grooves 31 to the oblique bearing surface between the flanges 16 of the saddle and the flanges 17 of the table. In this manner the lubricant is supplied to the bearing surfaces between the table and the saddle. At no time are the lubricant passageways uncovered by the movements of the saddle or table and consequently there is not a loss of pressure within them, and an inclined passageway 33 through the table communicating with one of the grooves 30 conveys a part of the lubricant to another inclined passageway 34 plugged at its upper end and communicating at its lower end with a passageway 35 extending the full length of the table and preferably formed by a pipe cast within the table. At its opposite ends this passageway 35 is connected by inclined passageways 36 with the bearings 20 and 21 of the feed screw 19 so that these bearings will be supplied with lubricant at all times notwithstanding the movements of the various parts.

By means of this invention the bearings of the table on the saddle and the bearings of the feed screw are supplied with lubricant under pressure at all times during the various adjustments and the traveling movements of the parts, and the passageways of the lubricating system formed by the grooves between the parts are prevented from having a material loss or escape of lubricant by reason of the tight fit of the bearing surfaces in which they are formed. By making the inclined passageway 33 connect with another inclined passageway 34 at a point higher than the passageway 35 it is prevented from draining the passageway 35 when the parts are disconnected.

What we claim as new and desire to secure by Letters Patent is:

1. In a milling machine having a knee and an adjustable saddle thereon and a movable table on the saddle, a lubricating system for the bearings of the table on the saddle comprising passageways through the knee and the saddle connected with the bearing surfaces therebetween, there being a groove in one of such bearing surfaces for maintaining communication between the passageways of the knee and the saddle in the different adjustments of the parts, the passageway of the saddle leading to the bearing surfaces of the table.

2. In a milling machine having a column, and an adjustable knee thereon, and an adjustable saddle on the knee, and a movable table on the saddle, a lubricating system for the bearings of the table on the saddle comprising passageways through the column and the knee and the saddle connected with the bearing surfaces therebetween, there being grooves in the bearing surfaces for maintaining communication between the passageways in the different adjustments of the parts, the passageway of the saddle leading to the bearing surfaces of the table.

3. In a milling machine having a column, and a vertically adjustable knee slidably mounted on the column and a horizontally adjustable saddle slidably mounted on the knee to have a movement longitudinally of the knee, and a table horizontally slidable on the saddle to have a movement transversely of the knee, a lubricating system for the bearing surface of the table comprising a lubricant supply pipe connecting with the bearing surface of the column, there being a vertical groove in the bearing surface of the knee communicating with the lubricant supply pipe in the different positions of the knee, a lubricant pipe communicating with the groove and with the bearing surface on the knee for the saddle, there being a transverse groove in the bearing surface of the saddle registering with the lubricant pipe in the different positions of the saddle, and passageways through the saddle at each side thereof communicating with the groove in the bottom of the saddle and connecting with the bearing surface on the saddle for the table.

4. In a milling machine having a column, and an adjustable knee thereon, and an adjustable saddle on the knee and a movable table on the saddle, and a feed screw journaled in bearings on the table for moving the table on the saddle, a lubricating system for the bearings of the table on the saddle and for the bearings of the feed screw, comprising passageways through the column and the knee and the saddle connected with the bearing surfaces therebetween, there being grooves in the bearing surfaces for maintaining communication between the passageways in the different adjustments of the parts, the passageway of the saddle leading to the bearing surfaces of the table, and a passageway extending longitudinally through the table and communicating with the bearings of the feed screw and having a passageway leading to it from the bearing surface between the table and the saddle.

5. In a milling machine having a column and an adjustable knee thereon and an adjustable saddle on the knee and a movable table on the saddle and a feed screw journaled in bearings on the table for moving the table on the saddle, a lubricating system for the bearings of the feed screw comprising passageways through the column and the knee and the saddle connected with the bearing surfaces therebetween, there being grooves in the bearing surfaces for maintaining communication between the passageways in the different adjustments of the parts, and a passageway extending longitudinally through the table communicating with the bearings of the feed screw.

6. In a milling machine having a knee and an adjustable saddle thereon and a movable table on the saddle and a feed screw journaled in bearings on the table for moving the table on the saddle, a lubricating system for the bearings of the feed screw, comprising passageways through the knee and the saddle connected with the bearing surfaces therebetween, there being grooves in one of such bearing surfaces for maintaining communication between the passageways of the knee and the saddle in the different adjustments of the parts, a passageway extending longitudinally through the table and having connection with the bearings of the feed screw, and a passageway communicating therewith and leading from the bearing surface between the table and the saddle and communicating with the passageway of the saddle.

7. In a milling machine having a knee and an adjustable saddle thereon and a movable table on the saddle and a feed screw journaled in bearings on the table for moving the table on the saddle, a lubricating system for the bearings of the feed screw, comprising passageways through the knee and the saddle connected with the bearing surfaces therebetween, there being grooves in one of such bearing surfaces for maintaining communication between the passageways of the knee and the saddle in the different adjustments of the parts, a passageway extending longitudinally through the table and having connection with the bearings of the feed screw, and a passageway communicating therewith and leading from the bearing surface between the table and the saddle, the last mentioned passageway having an intermediate part higher than the longitudinal passageway through the table.

In testimony whereof, we affix our signatures, in presence of two witnesses.

JOHN GOETZ.
WILLIAM K. BUXBAUM.
FRED A. PARSONS.

Witnesses:
E. E. LEASON, Jr.,
PETER LOWE.